Patented June 30, 1931

1,812,761

UNITED STATES PATENT OFFICE

ROYALE HILLMAN STEVENS, GERALD CHAD NORRIS, AND WILLIAM NELSON WATSON, OF BROKEN HILL, NORTHERN RHODESIA, SOUTH AFRICA, ASSIGNORS TO RHODESIA BROKEN HILL DEVELOPMENT COMPANY LIMITED, OF BROKEN HILL, NORTHERN RHODESIA

REMOVAL OF PHOSPHORUS FROM METAL BEARING SOLUTIONS

No Drawing. Application filed September 24, 1926, Serial No. 137,622, and in Southern Rhodesia April 7, 1926.

The present invention relates to the removal of phosphorus from metal-bearing solutions.

The invention is applicable both as a method of purifying solutions containing valuable metals such as zinc, copper and/or vanadium, by the elimination of phosphorus therefrom, and as a method of recovering a commercial phosphorus product from such solutions. A particular feature of the invention is the provision of a phosphorus elimination method which can be incorporated in the usual process for the electrolytic recovery of zinc.

According to the invention the phosphorus is precipitated as a ferric phosphate.

With this object a soluble ferric compound such as ferric sulphate is added to, or caused to be present in, the acid metal bearing solution. The ferric phosphate precipitate can then be obtained by neutralizing the solution; or by limiting the acidity and heating the solution; or by combinations of both these methods.

The acid neutralization method can conveniently and economically be embodied in those processes in which the acid leach liquor, obtained by leaching a zinc, copper or vanadium ore with acid, is neutralized for the precipitation therefrom of silica, iron, alumina and the like. The ferric compound is in that case added to or produced in the solution before the neutralization step. The phosphorus may either be removed with the other impurities or it may be recovered as a separate product, provided the silica, iron or alumina content of the solution is moderate.

However, the recovery of the phosphorus as a separate product is as a rule accomplished more conveniently by the method involving control of the acidity and heating of the solution; this method facilitating the production of a high grade phosphorus product since both the acidity and the heating of the solution tend to prevent the precipitation of any of the other constituents in the solution.

In order to ensure the substantially complete precipitation of the phosphorus it is desirable to add at least one part by weight of ferric iron for each part by weight of phosphoric pentoxide in the solution treated.

In applying the invention to the recovery of zinc or copper from ores containing these metals, the ore is leached with sulphuric acid in a suitable manner to bring such metals into solution.

The leaching operation is so conducted as to leave the final solution slightly acid. After the acid solution has been separated from the leach residue, a ferric compound such as ferric sulphate is added to it.

According to one form of further procedure, the acid solution, preferably at an elevated temperature such as 55° C., is neutralized by addition of a base such as zinc oxide, zinc dross, oxide ore, lime or limestone, sufficient base being added to neutralize all free acid. At this stage the phosphorus will be completely precipitated. This circumstance may be taken advantage of to recover the phosphorus precipitate separately, such precipitate being settled and removed before precipitation of the silica, which is subsequently effected by addition of an excess of the base.

Alternatively the acid leach solution in which ferric sulphate is present and preferably heated as above mentioned is neutralized by addition of an appropriate base and agitated in the presence of a slight excess of the base whereby the phosphorus in the solution is precipitated together with silica, iron, alumina and other impurities.

As the phosphorus precipitate tends to be bulky and thus to accentuate the difficulty of separating the solution, caused by the gelatinous nature of the silica precipitate, it is desirable to granulate the precipitate as described in application for Letters Patent No. 137,621.

Provided sufficient ferric iron is present in the solution at this stage the phosphorus is removed, together with other impurities, entirely as a ferric phosphate. If ferric iron were not present the treatment of the solution with a basic material such as zinc oxide would result in the precipitation of the phosphorus as a phosphate of the valuable metal e. g., zinc phosphate, causing loss of zinc in the impurity precipitate.

The precipitate containing phosphorus, silica etc., is, if desired, subjected to weak acid washes, as described in the aforesaid application No. 137,621, filed September 24, 1926, to recover residual valuable metal which may have entered the impurity precipitate. The separated solution is thereupon treated as necessary for the removal of such further impurities as cadmium, cobalt or nickel; and, after their removal, is electrolyzed for recovery of metallic zinc or copper.

Another precedure, after addition of the ferric sulphate as above mentioned, is to keep the solution slightly acid and to heat it to a temperature of 60° to 90° C. and preferably to about 80° C. By this means the ferric phosphate is obtained in a state of substantial purity, which is not the case when the solution is rendered neutral or basic. After removal of this precipitate, the solution is neutralized by the addition of a slight excess of base for the removal of silica, iron and alumina, together with such small amounts of phosphorus as may remain in the solution.

In treating ores containing vanadium the precedure is the same as that described above except that it is necessary to have the vanadium in the tetravalent condition during the purification treatment in order to prevent its precipitation with the impurities. When the vanadium is present in the solution in the pentavalent condition, its reduction may be effected by adding a reducing agent such as ferrous sulphate prior to the purification step.

Ferrous sulphate thus added is oxidized to the ferric condition by its reaction with the pentavalent vanadium, thus providing the ferric compound which is available for the precipitation of the phosphorus.

The separately recovered ferric phosphate, suitably purified, may be used as a soil fertilizer, its fine state of division being advantageous for that purpose; or it can be employed as the basis for the preparation of other phosphate compounds.

We claim:

1. The process of purifying a metal-bearing acid solution containing phosphorus which consists in treating the solution to produce therein at least one part by weight of ferric iron for each part by weight of phosphoric pentoxide therein, further treating the solution to precipitate the phosphorus as ferric phosphate, and separating the solution from the precipitate.

2. The process of purifying a vanadium-bearing solution containing phosphorus, which consists in first producing a solution of vanadium in tetravalent condition, then treating the solution in the presence of ferric iron to precipitate the phosphorus therefrom as ferric phosphate, and finally removing the solution from the precipitate while the vanadium is still in the tetravalent condition.

3. The process of purifying a vanadium bearing solution containing phosphorus, which consists in first producing a solution of vanadium in the tetravalent condition, then providing a ferric compound in the acid solution, then treating the solution to precipitate the phosphorus as ferric phosphate, and finally separating the solution from the precipitate while the vanadium is still in the tetravalent condition.

4. The process of treating a solution containing pentavalent vanadium and phosphorus, which consists in adding a ferrous compound to the solution, thereby reducing the vanadium to the tetravalent condition and oxidizing the ferrous compound to the ferric condition, and thereafter treating the solution for the precipitation of a ferric phosphate.

5. The process of treating an acid solution containing pentavalent vanadium and phosphorus, which consists in adding a ferrous compound to the solution, thereby reducing the vanadium to the tetravalent condition and oxidizing the ferrous compound to the ferric condition, and thereafter neutralizing the solution and thereby precipitating a ferric phosphate.

6. The process of treating an acid metal-bearing solution containing phosphorus, silica and ferric iron, which consists in treating the solution to precipitate a ferric phosphate, recovering the ferric phosphate and thereafter adding an excess of base to precipitate silica.

7. The process of treating an acid metal-bearing solution containing phosphorus, silica and ferric iron which consists in neutralizing the solution and thereby precipitating a ferric phosphate, recovering the ferric phosphate and thereafter adding an excess of base to precipitate silica.

8. The process of treating an acid solution containing tetravalent vanadium, phosphorus and ferric iron, which consists in neutralizing the solution and thereby precipitating a ferric phosphate while the vanadium remains in solution.

In testimony whereof we affix our signatures.

ROYALE HILLMAN STEVENS.
GERALD CHAD NORRIS.
WILLIAM NELSON WATSON.